Dec. 22, 1959     E. L. THOMAS ET AL     2,918,218
ANALOGUE COMPUTER
Filed Feb. 23, 1954     14 Sheets-Sheet 1
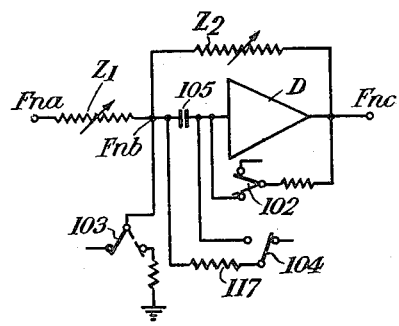
Fig. 1.
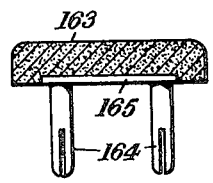
Fig. 20
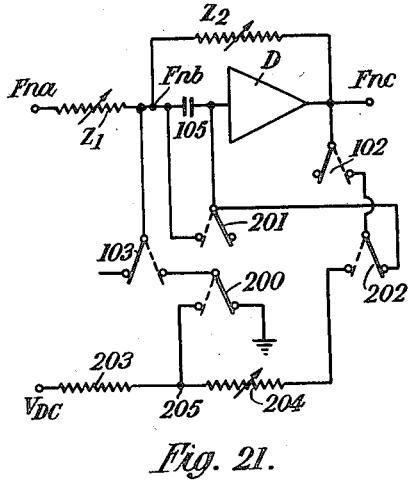
Fig. 21.
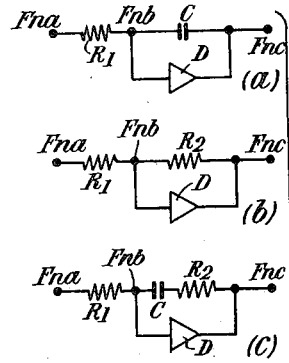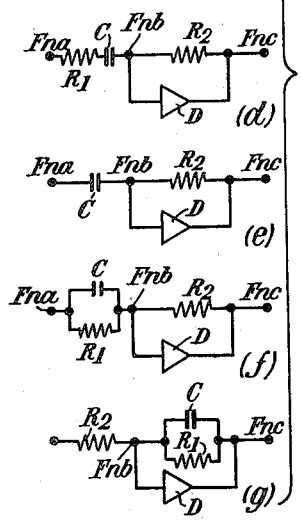
Fig. 2.
INVENTORS
Eric L. Thomas
Robert J. A. Paul
By Watson, Cole, Grindle &
Watson
ATTORNEYS Dec. 22, 1959  E. L. THOMAS ET AL  2,918,218
ANALOGUE COMPUTER
Filed Feb. 23, 1954  14 Sheets-Sheet 5

INVENTORS
Eric L. Thomas
Robert J. A. Paul
By Watson, Cole, Grindle &
Watson
ATTORNEYS Dec. 22, 1959  E. L. THOMAS ET AL  2,918,218
ANALOGUE COMPUTER
Filed Feb. 23, 1954   14 Sheets-Sheet 6
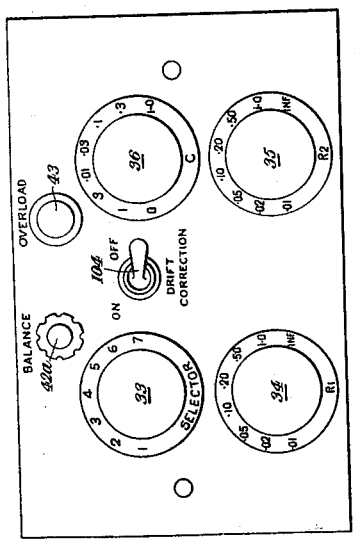
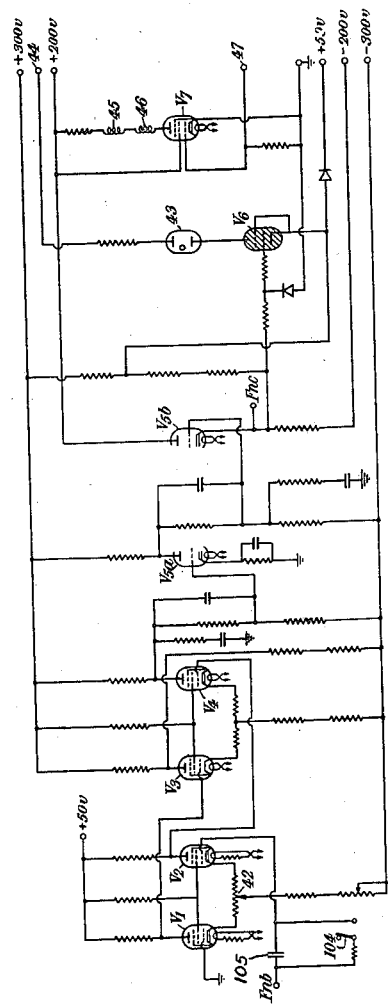
INVENTORS
Eric L. Thomas
Robert J. A. Paul
By Watson, Cole, Grindle
Watson
ATTORNEYS

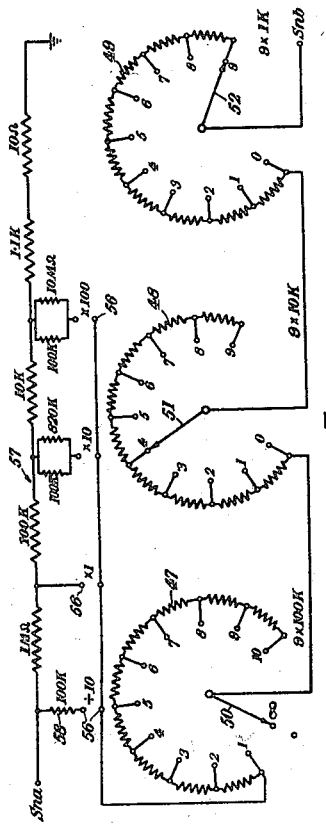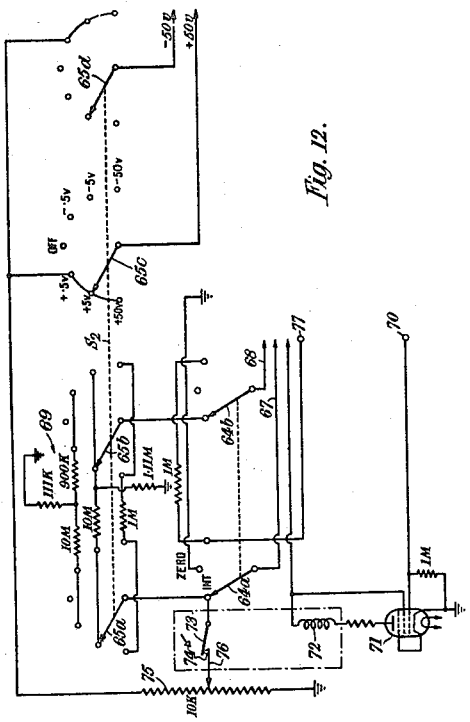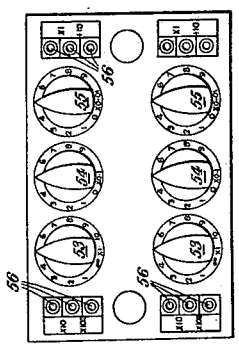

INVENTORS
Eric L. Thomas
Robert J. A. Paul
By Watson, Cole, Grindle
& Watson
ATTORNEYS Dec. 22, 1959     E. L. THOMAS ET AL     2,918,218
ANALOGUE COMPUTER
Filed Feb. 23, 1954     14 Sheets-Sheet 11

(a)
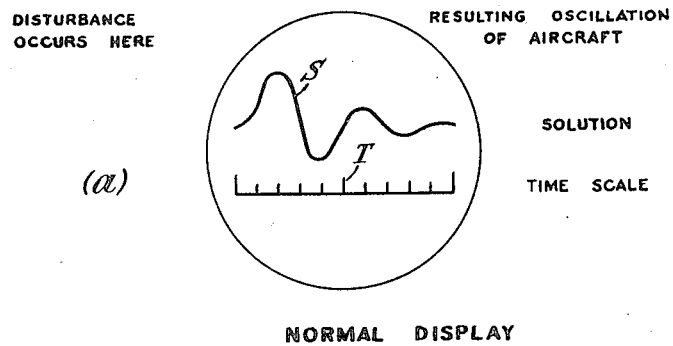
DISTURBANCE OCCURS HERE    RESULTING OSCILLATION OF AIRCRAFT
SOLUTION TIME SCALE

NORMAL DISPLAY (b)
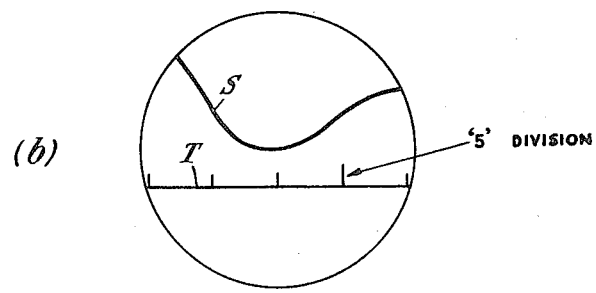
'5' DIVISION

SHOWING EFFECT OF SWEEP EXPANSION
FOR ENLARGING ANY PORTION OF TRACE (c)
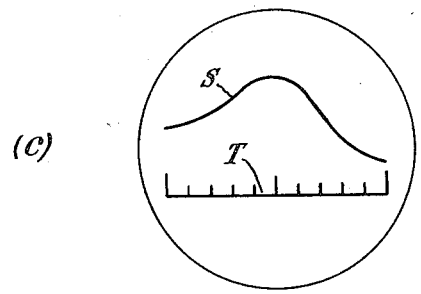

SHOWING EFFECT OF INCREASING
INTEGRATOR TIME CONSTANTS
OR INCREASING SWEEP SPEED

*Fig. 16.*

INVENTORS
Eric L. Thomas
Robert J. A. Paul
By Watson, Cole, Grindle &
Watson
ATTORNEYS

United States Patent Office 2,918,218
Patented Dec. 22, 1959

2,918,218

ANALOGUE COMPUTER

Eric Lloyd Thomas, Hollywood, and Robert John Alexander Paul, Belfast, Northern Ireland, assignors to Short Brothers and Harland Limited, Belfast, Northern Ireland, a British company Application February 23, 1954, Serial No. 411,956

Claims priority, application Great Britain February 23, 1953

14 Claims. (Cl. 235—182)

This invention relates to analogue computer of the kind comprising an electrical network which can be set up to represent a differential equation expressing the behaviour of a system to be investigated and which will indicate on an oscilloscope screen or other device (e.g. a pen recorder), in response to a transient pulse or forcing function, a solution of the equation.

Such a computer in its simplest form comprises, for the purpose of solving a linear differential equation, a number of D.C. amplifiers which can be connected to function either as adders or as integrators, as desired, feed-back from the output to the input of the amplifier being provided in the former case through a resistor and in the latter case through a capacitor. Feed-back must also be provided from one amplifier to another. In the case of simultaneous differential equations a computing channel of this kind is required for each variable in the equations, i.e. if the equations represent the variations of the quantities $x$, $y$ and $z$ with time, $t$, three channels will be required, one for evaluating $x$, one for evaluating $y$ and the other for evaluating $z$, all as functions of time. Feed-back connections will then be required not only between the individual amplifiers of each computing channel but also between amplifiers in different computing channels.

It will be appreciated that considerable difficulty may be experienced in establishing the various electrical connections which are necessary to set the computer appropriately for a given problem; and a further complication arises from the fact that when the computer is to be used for simulating a servo system, it may also be necessary to connect certain of the amplifiers to operate as differentiators or generate other functions.

With a view to overcoming these difficulties the invention provides an analogue computer comprising a number of computing units, which include D.C. amplifiers, each having an associated function unit constituted by impedances for respectively providing an input to and feed back in the amplifier, and scaling units for providing feed back between the amplifiers, each scaling unit being constituted by an adjustable resistor, and a set-up panel having terminals wired to terminals of all the computing units, the terminals on the panel bearing markings indicative of the connected computing unit terminals and being so disposed as to permit of the establishment of connections between the computing unit terminals by connectors bridging closely adjacent terminals on the panel.

Each D.C. amplifier has its output 180° out of phase with its input and the operation which it is to perform is determined by the associated function unit. This, in the preferred form of the invention, comprises a pair of resistors and a capacitor and switch mechanism whereby the connections between the component impedances of the function unit and the amplifier can be varied to set up the amplifier to operate as an adder, an integrator or a differentiator, as desired, and also whereby the individual values of said impedances may be varied.

It is convenient to have each amplifier permanently connected to its associated function unit to form a three-terminal network as shown in Fig. 1 of the accompanying drawings. Here $Z_1$ and $Z_2$ are the generalised impedances of the two arms of the network. Each of these impedances, according to the setting of the function unit, may comprise a capacitor only, a resistor only, a capacitor and a resistor in series, and a capacitor and a resistor in parallel, consistent of course with the function unit comprising but two resistors and one capacitor in all. Preferably each function unit has four adjustable switch knobs, one for determining the combination and the others for adjusting the values of its three components.

One embodiment of analogue computer according to the invention will now be described in detail, by way of example, with reference to the accompanying drawings, in which:

Figs. 1–4 are circuit diagrams explanatory of the invention,

Figure 8:
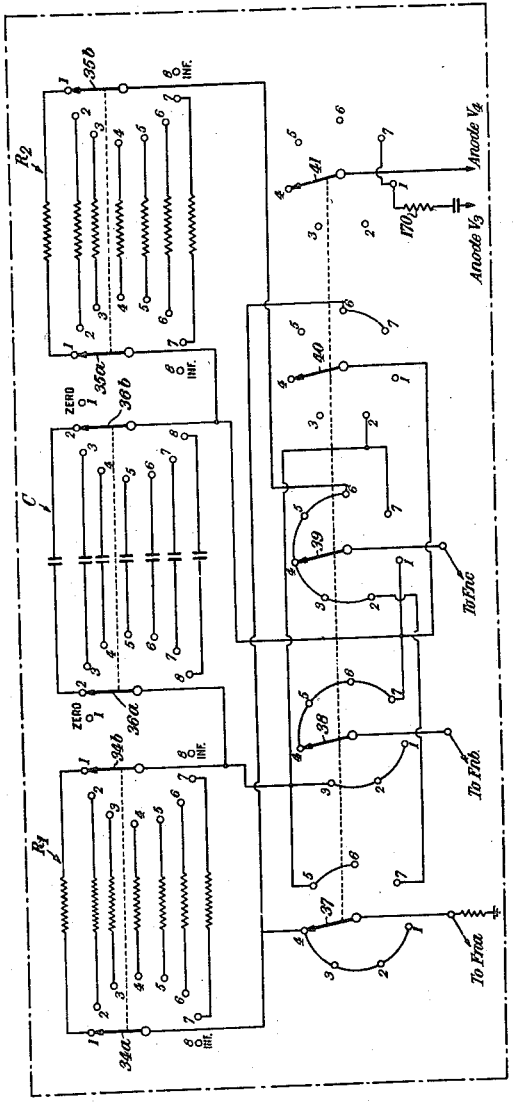
Figure 13:
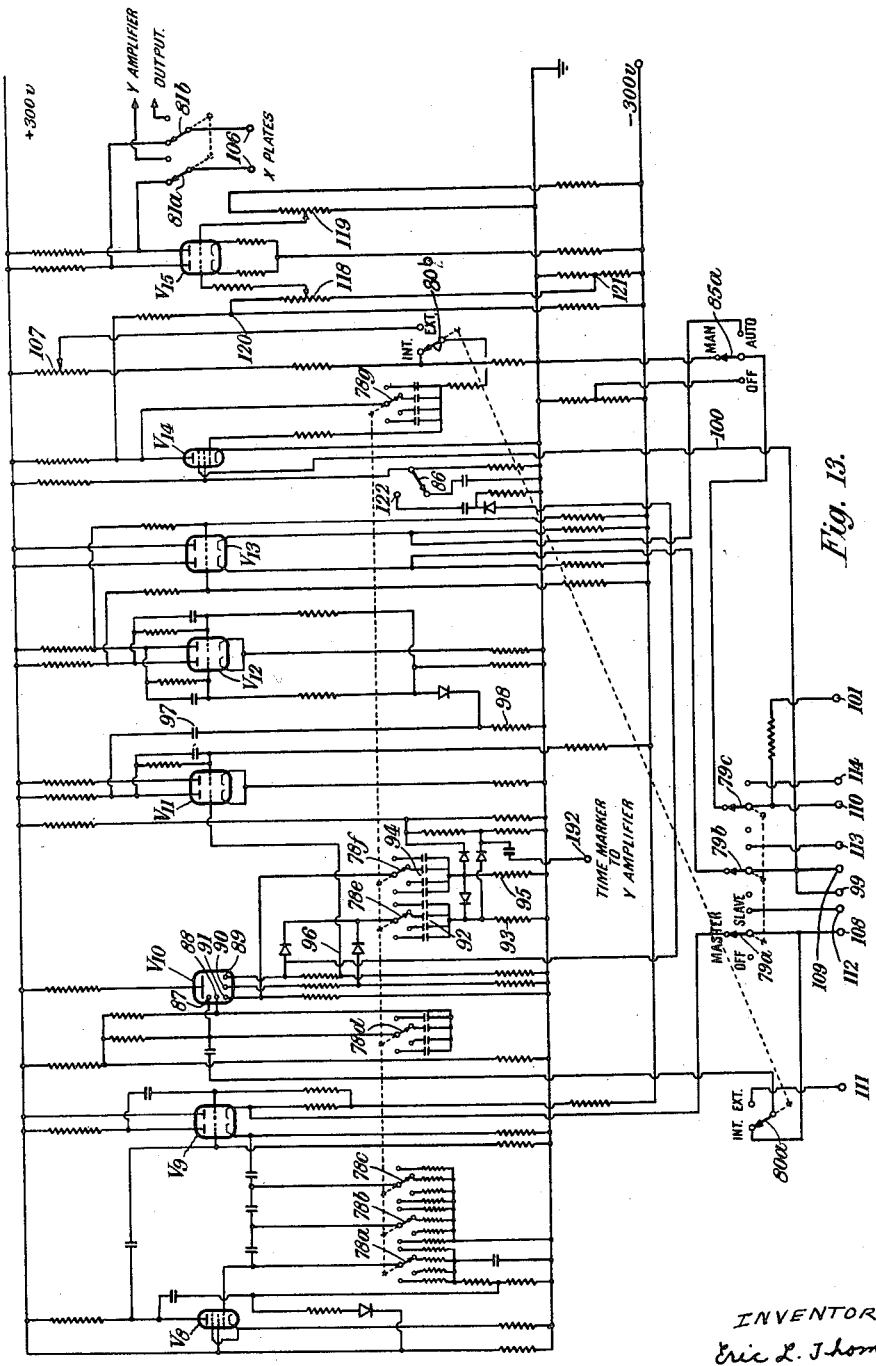
Figure 14:
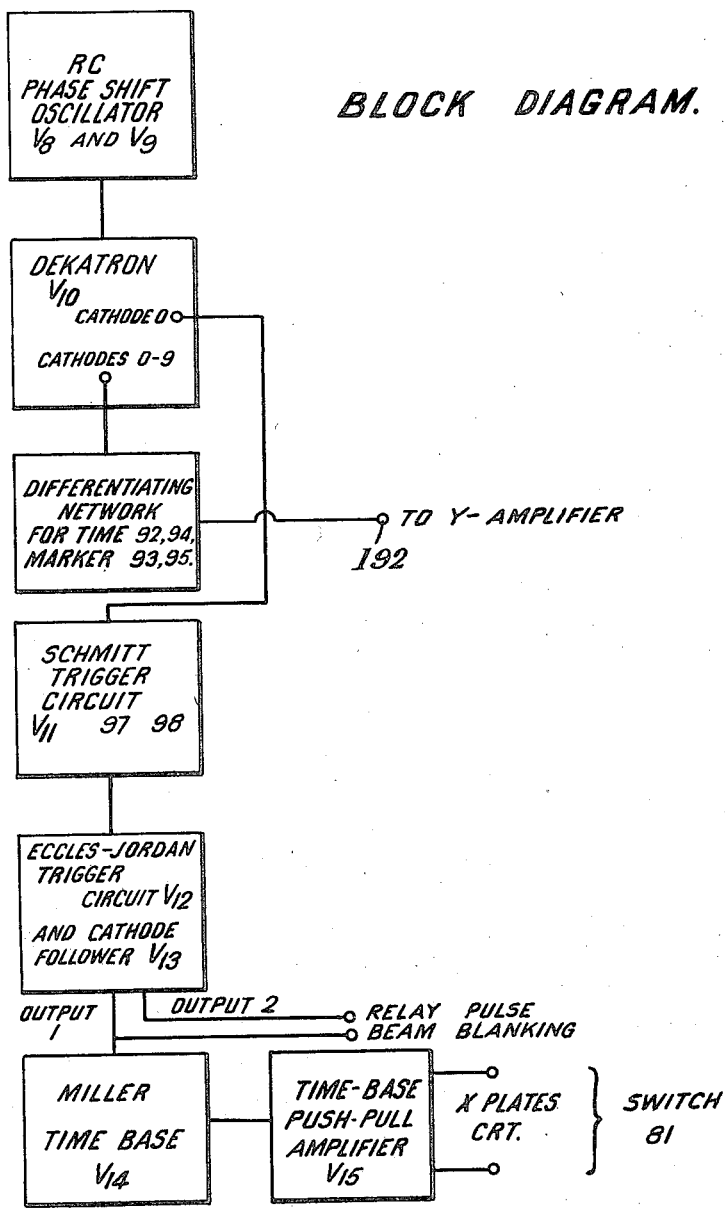
Figure 15:
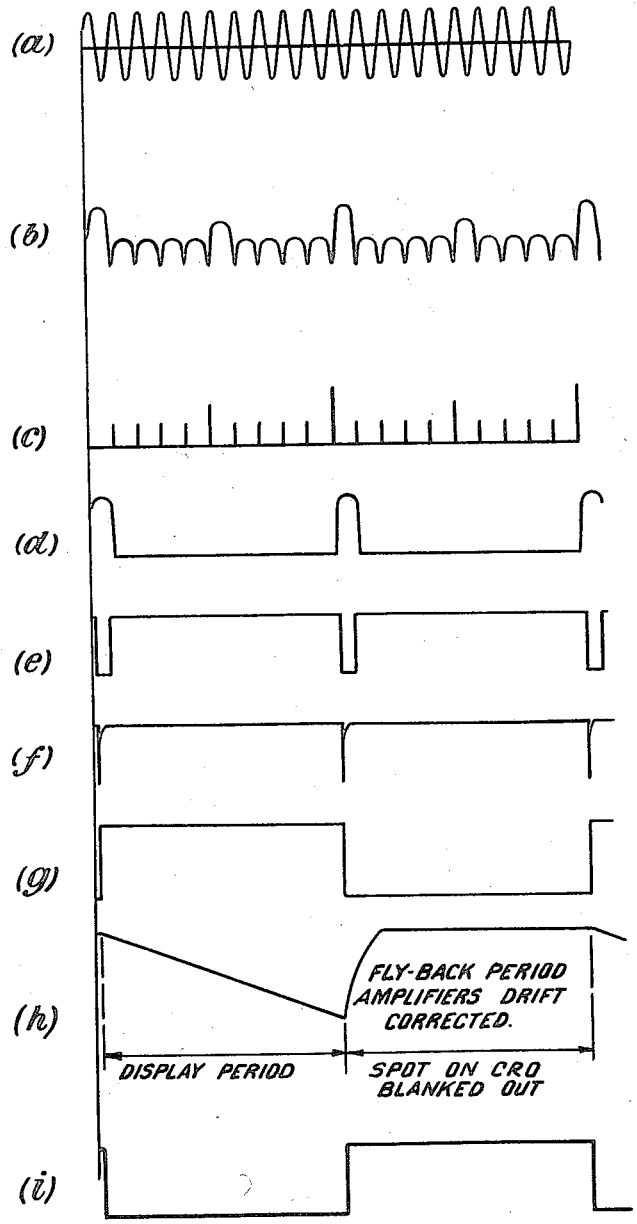
Figure 17:
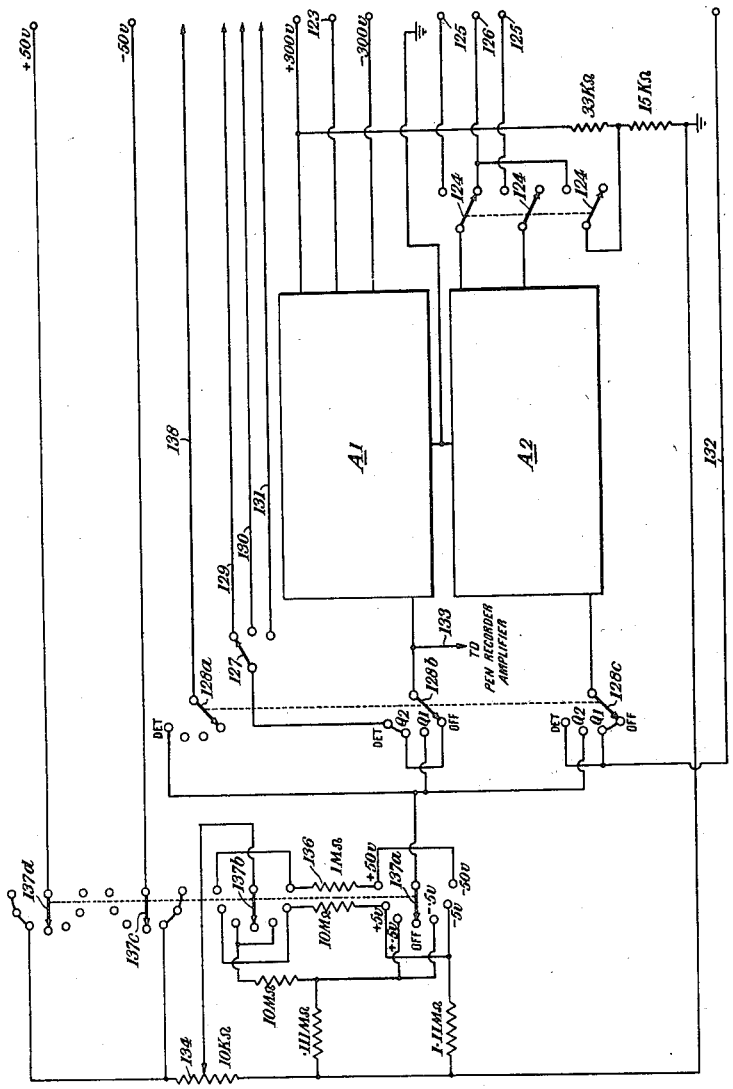
Figure 18:
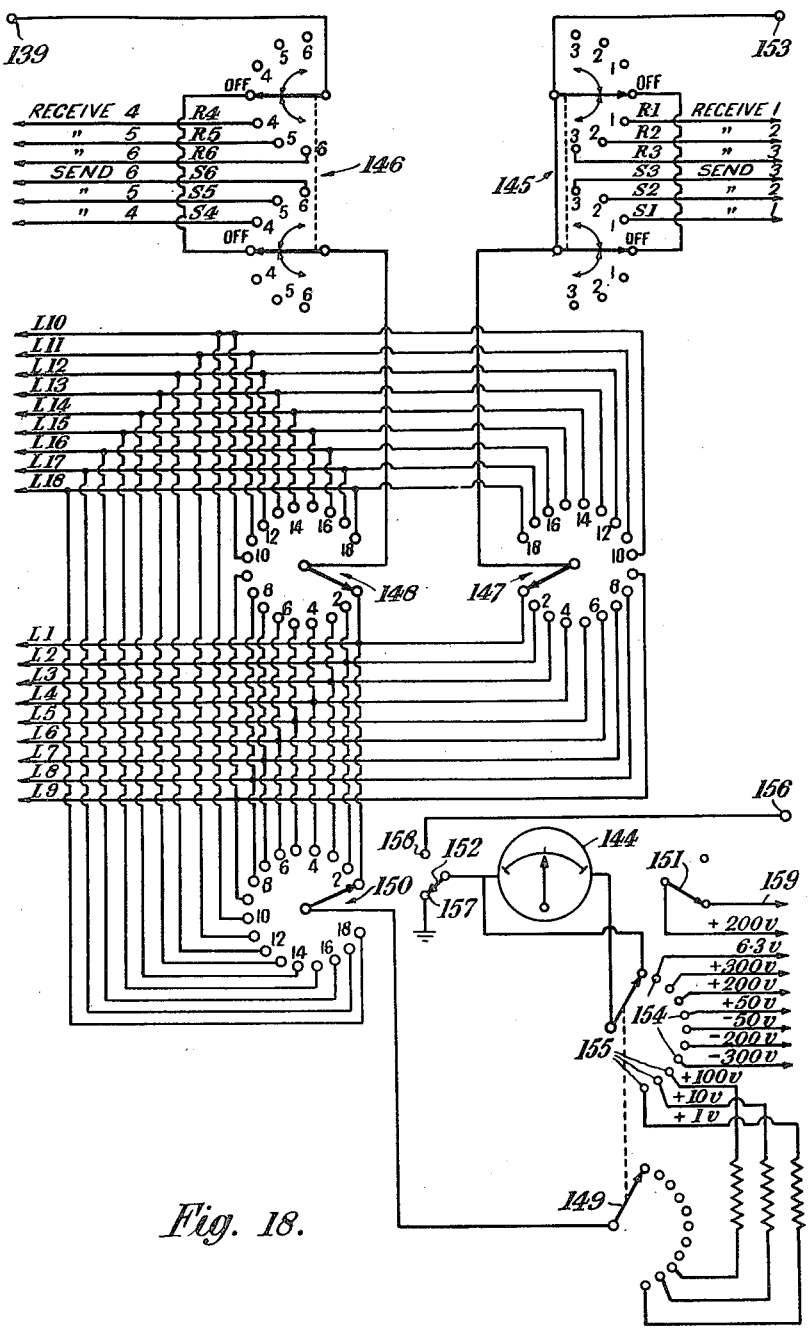
Figure 19:
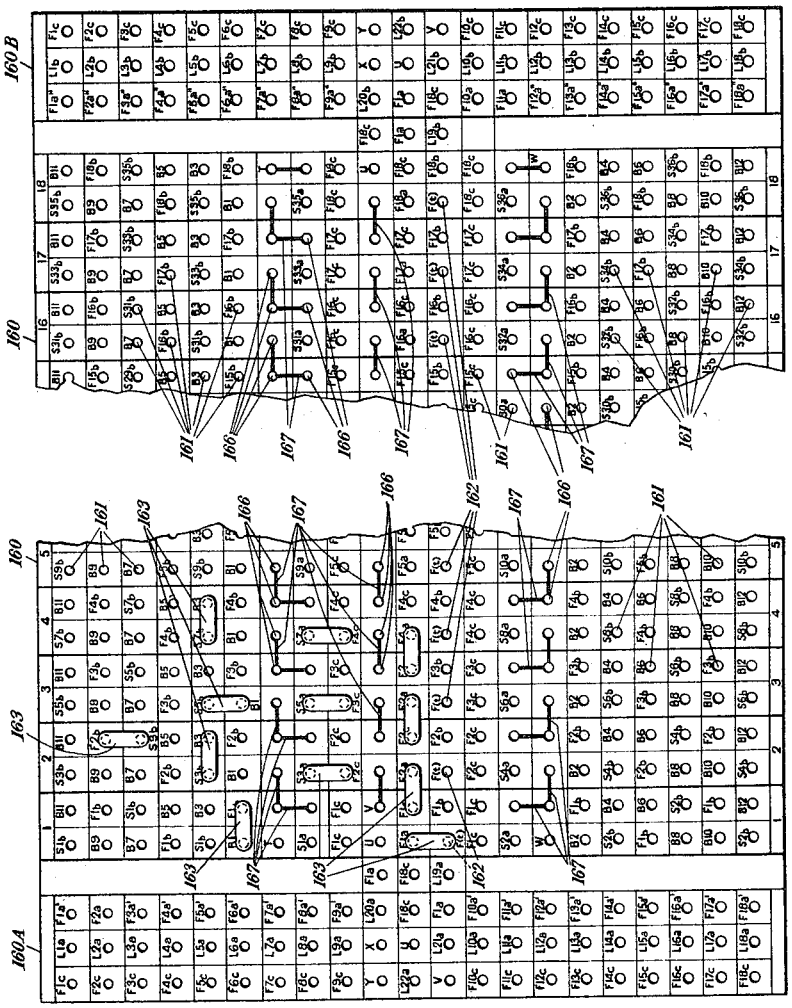

Fig. 8 is a circuit diagram illustrating the operation of the control switches associated with one of the function units, Fig. 8A is an enlarged front view of a panel of one of the function units, Fig. 9 is a circuit diagram of the D.C. amplifier of one of the function units, Fig. 10 is a circuit diagram of one of the scaling units, Fig. 11 is an enlarged front elevation of the front panel of one of the double scaling units, Fig. 12 is a diagram showing the circuits used in generating the forcing function, Fig. 13 is a circuit diagram of the timing unit, Fig. 14 is a corresponding block diagram, Fig. 15 shows the wave forms generated at various stages in the timing unit, Fig. 16 illustrates typical displays on the oscilloscope screen, Fig. 17 is a circuit diagram of the Y amplifier, Fig. 18 is a circuit diagram of the meter, Fig. 19 is a plan view of part of the set-up panel, Fig. 20 shows one of the plugs used for establishing connections on the set-up panel, and Fig. 21 shows a modified form of function unit for use in introducing initial conditions.

Like reference characters designate like parts throughout the figures.

The computer shown in the drawings comprises a number of combined amplifiers and function units (Fig. 1) each comprising a D.C. amplifier D and associated impedances $Z_1$, $Z_2$. F$na$ and F$nb$ are alternative input terminals to the function unit and F$nc$ represents its ouput terminal. Feed back occurs through the impedance $Z_2$.

These units can be set up, as later described, in the alternative configurations shown in Figs. 2($a$)–($g$). When the computer is used for the solution of simultaneous linear differential equations, certain of the units are set up as adders Fig. 2($b$) and others as integrators Fig. 2($a$). In the case of the adder feed back is through a resistor $R_2$, while in the case of the integrator it is through a capacitor C.

If a voltage $V_1$ is applied at the input terminal F$na$ of the adder, Fig. 2($b$), the output voltage $V_0$ at the output terminal F$nc$ is approximately $$-\frac{R_2}{R_1}V_1$$

Where a number of input voltages $V_1$, $V_3$, $V_4$, ... are applied to the terminal $Fnb$ of the adder in parallel through resistors $R_1$, $R_3$, $R_4$ ..., $$V_0 \doteq -\left[V_1\frac{R_2}{R_1}+V_3\frac{R_2}{R_3}+V_4\frac{R_2}{R_4}\ldots\right]$$

or, if all the resistors are equal $$V_0 \doteq -(V_1+V_3+V_4\ldots)$$

In the case of the integrator, Fig. 2(a), the relationship between the output voltage at terminal $Fnc$ and the input voltage at terminal $Fna$ is represented by $$V_0 \doteq -\frac{1}{CR_1}\int V_1 dt$$

$CR_1$ being termed the integrator time constant.

Where the computer is to be used for simulating a servo system and for certain other purposes, the units may need to be set up in the other ways shown in Figs. 2(c)–(g), the arrangement of Fig. 2(e) providing for differentiation and that of Fig. 2(f) for phase advance. The basic principle of the computer may be understood from the set up, indicated in Fig. 3, for the solution of the equation $$L\frac{d^2q}{dt^2}+R\frac{dq}{dt}+\frac{q}{C}=E_0$$

In this case the amplifiers $D_1$, $D_2$ are set up as adders and the amplifiers $D_3$, $D_4$ as integrators. Account of the coefficients is taken by the scaling resistors $S_3$, $S_5$, $S_7$ of value $$\frac{1}{L}, \frac{1}{R} \text{ and } C$$

respectively. If the output at $F_{2c}$ is assumed to be $+\ddot{q}$ that at $F_{3c}$ will be $-\dot{q}$ and that at $F_{4c}$ will be $+q$ since the integrator time constants are unity. If a transient, representing $E_0$, is injected as a forcing function at $F_{1a}$, the output at $F_{1c}$ will be $-E_0+R\dot{q}$. The output $\ddot{q}$ at $F_{2c}$ will be $$-\frac{1}{L}\left(-E_0+R\dot{q}+\frac{q}{c}\right)$$

so that the above equation is satisfied. Application of the output voltage at $F_{4c}$ to an oscilloscope screen or to a pen recorder will accordingly give a graphical solution of the equation.

The resistor $S_3$ may be the resistor $R_2$ of Fig. 2(b) adjusted to a suitable value, or a separate scaling resistor, $R_2$ being set to infinity.

In certain cases it may be convenient to work with integrator time constants other than unity, e.g.

$$\frac{1}{10}$$

In such a case the output at $F_{3c}$ would be $-10\dot{q}$ and that at $F_{4c}$, $100q$ and scaling resistors $S_5$ and $S_7$ would have to be set to $$\frac{10}{R} \text{ and } 100\ C$$

respectively, if a solution with true time scale is required. If, however, the scaling resistors remain set at $$\frac{1}{R} \text{ and } C$$

then the solution is displayed in one-tenth of true time.

Figure 4:
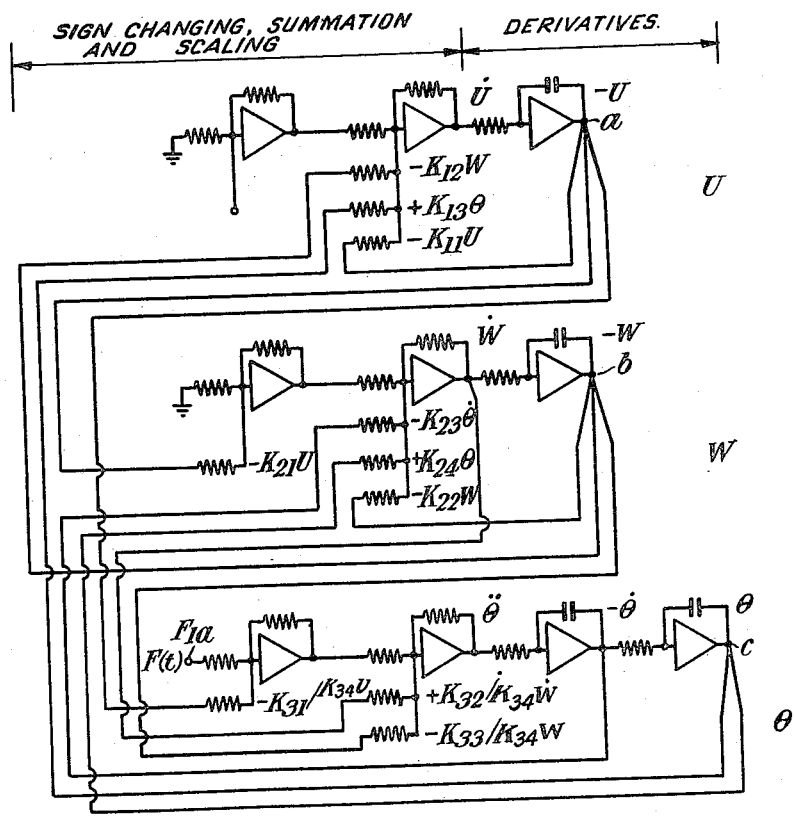

An example of a more complex set up is shown in Fig. 4. This is for solving the following differential equations governing the longitudinal stability of an aircraft in pitch motion with the stick fixed, U representing forward velocity, W vertical velocity and $\theta$ angle of incidence $$\frac{du}{dt}-K_{11}U-K_{12}W+K_{13}\theta=0$$

$$K_{21}U+\frac{dw}{dt}-K_{22}W-K_{23}\frac{d\theta}{dt}+K_{24}\theta=0$$

$$K_{31}U+K_{32}\frac{dw}{dt}-K_{23}W+K_{34}\frac{d^2\theta}{dt^2}=F(t)$$

The set up involves three computing channels as shown in Fig. 4, with the scaling resistors set up to introduce the appropriate coefficients in the terms applied to the various adders. The forcing function $F(t)$ is injected at $F_{1a}$ and solutions for U, W and $\theta$ may be obtained by applying the outputs at a, b and c respectively to the oscilloscope.

Figure 5:
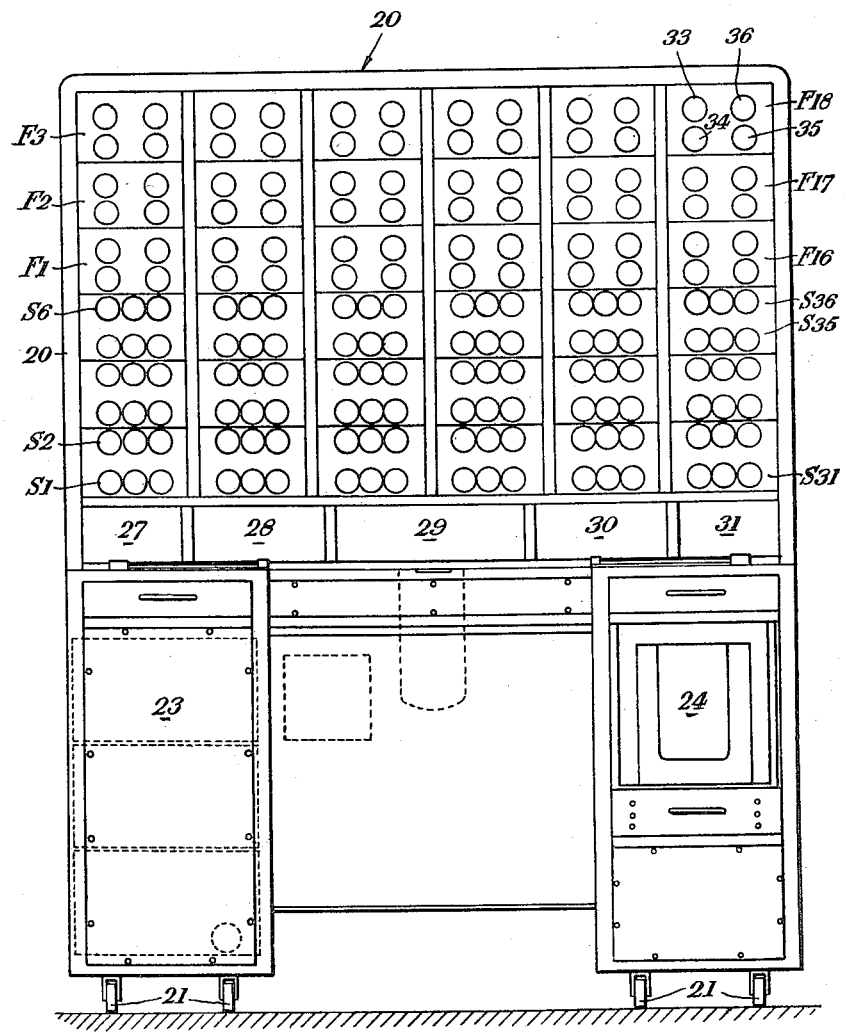
Fig. 5 is a front elevation of the computer.
Figure 6:
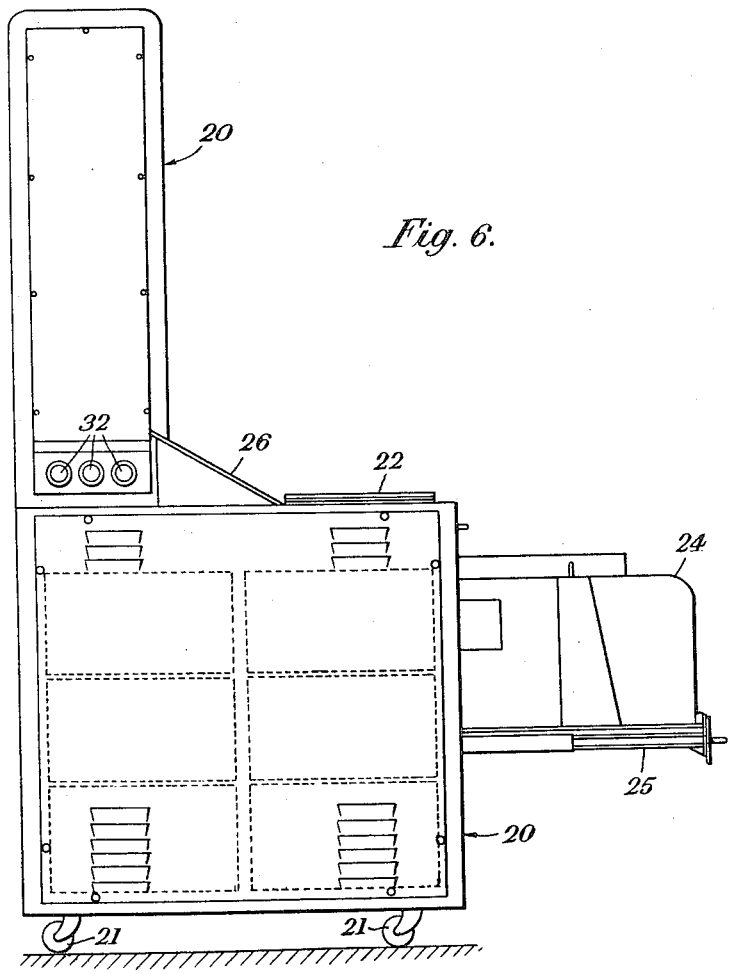
Fig. 6 is a corresponding side elevation.

Turning now to Figs. 5 and 6, the computer comprises a cabinet 20 mounted on wheels 21. In racks on the cabinet are mounted 18 combined amplifier and function units $F_1$–$F_{18}$, and 18 double scaling units $S_1$–$S_{36}$. Each function unit is individually removable from the cabinet and has at its rear end plugs which establish contact between the terminals $Fa$, $Fb$, $Fc$ of the function unit and corresponding sockets wired to correspondingly numbered sockets 161 in a set-up panel 160 (Fig. 19) which is described later. Each double scaling unit (e.g. $S_1$ and $S_2$) is similarly removable and the terminals $Sa$ and $Sb$ of each scaling unit are likewise connected, by plug and socket connections and internal wiring, to similarly numbered sockets in the set-up panel. The sockets in the set-up panel are marked with the number of the associated function or scaling unit together with the letter associated with the corresponding terminal. Thus those associated with function unit $F_5$ are marked $F_{5a}$, $F_{5b}$ and $F_{5c}$ and those associated with the scaling unit $S_7$ are marked $S_{7a}$ and $S_{7b}$. All correspondingly coded sockets in the set-up panel are permanently connected in parallel to the corresponding terminal of the associated function or scaling unit. The set up panel is horizontal and, when not in use, is covered by hinged flaps, one of which is shown in Fig. 6 at 22. The various power units are disposed in the left hand pedestal 23 of the cabinet while a pen recorder 24 of conventional construction is mounted on a drawer 25 in the right hand pedestal.

On a sloping panel 26 (Fig. 6) are mounted a power switching panel 27 (Figs. 5 and 7), a timing unit panel 28, a cathode ray tube display panel 29, a Y amplifier panel 30 and a meter panel 31. At each side the computer has sockets 32 (Fig. 6) by which connections may be made to a companion computer.

Each function unit, Figs. 2 and 8, comprises a pair of resistors $R_1$, $R_2$, a capacitor C, a rotary selector switch 33 (Fig. 8A) and rotary switches 34, 35, 36 for determining respectively the values of $R_1$, $R_2$ and C. The selector switch 33 has five arms 37–41, which move in unison as the switch is rotated, each over a bank of 7 contacts. The switch arms 37, 38 and 39 are connected respectively to the terminals $Fna$, $Fnb$ and $Fnc$ (Fig. 2). When the arms of the selector switch are on their contacts 1–7 respectively, the function unit is set up as shown in Fig. 2(a)–(g), contact 1 corresponding to Fig. 2(a), contact 2 to Fig. 2(b) and so on. The circuits, which are varied in accordance with the positions of the arms 37–40, can readily be traced from Fig. 8. Thus, in position 4 of the selector switch shown in Fig. 8, a circuit is established from $Fna$, through the switch arm 37, its contact 4, resistor $R_1$ and capacitor C in series, and contact 4 of switch arm 38 to $Fnb$. Another circuit is established from $Fnb$ through switch arm 38 and its contact 4, resistor $R_2$ and contact 4 of switch arm 39 to $Fnc$, i.e. the function unit is set up in accordance with Fig. 2(d).

The switches 34, 35, 36 are two pole eight position switches. The resistors $R_1$, $R_2$ can be set, according to the position of the arms 34a, b and 35a, b of associated switches 34, 35, to the following values: 10, 20, 50, 100, 200 and 500 kilo-ohms, 1 megohm and infinity. The capacitor C can be set, according to the position of the arms 36a, b of the switch 36, to the following values of capacitance: 0, 0.001, 0.003, 0.01, 0.03, 0.1, 0.3, 1.0 μF.

As shown in Fig 9, the amplifier comprises two pairs of cathode coupled pentodes $V_1$, $V_2$ and $V_3$, $V_4$ with a single valve stage and a cathode follower output stage constituted by valves $V_{5a}$ and $V_{5b}$ in a common envelope. A potentiometer 42, adjustable by a knob 42a, Fig. 8A, provides the adjustment for zero output voltage balance. The maximum operating output voltage of the amplifier is ±50 volts. If the output voltage exceeds this value, a thyratron $V_6$ strikes, energising a neon indicator lamp 43. Anode voltage at 200 volts is supplied to the valve $V_6$ from terminal 44. The amplifier also includes a valve $V_7$, having in its anode circuit relay coils 45, 46 which, on arrival of a relay control pulse at terminal 47, apply drift correction and clamping to the amplifier as later described. When the selector switch 33 is in its positions 1 and 7, its arm 41 (Fig. 8) inserts a network 170 between the anodes of valves $V_3$, $V_4$ (Fig. 9) so ensuring stability of the feed back amplifier under these conditions.

The scaling unit shown in Fig. 10 comprises a potential divider 57 in association with three resistors 47, 48, 49 in series, with associated switch arms 50, 51, 52 actuable respectively by knobs 53, 54, 55 (Fig. 11). The scaling unit has terminals Sna, Snb, contact between which is obtained by moving the wiper 50 off its "infinity" position and inserting a two pin attenuator plug to bridge sockets 56 at one of the positions marked ÷10, ×1, ×10 and ×100 in Figs. 10 and 11. The resistor 47 comprises nine steps, each of 100 kilo-ohms, the resistor 48 nine steps, each of 10 kilo-ohms and the resistor 49 nine steps, each of 1 kilo-ohm.

The dials associated with the knobs 53, 54, 55 are graduated in terms of megohms, tenths of megohms and hundredths of megohms respectively. Assuming that they are set respectively to 3, 5 and 4, and that the attenuator plug is placed in position ÷10, the resistor 47 of value 200 K, in series with the 100 K resistor 58 will give a resistance of 300 K, the resistor 48 a resistance of 50 K and the resistor 49 a resistance of 4 K. Thus, although the knobs have been set to 3.54 megohms, the resistance of the scaling unit will be .354 megohms.

When the attenuator plug is placed in the position ×1 the potentiometer 57, the resistors of which have the values shown in Fig. 10, attenuates to one-tenth the input signal at the terminal Sna, with the result that the effective resistance of the scaling unit is increased tenfold. With the knobs set to the positions just stated, the effective resistance of the scaling unit will be 3.54 megohms, i.e. equal to the value set up on the panel of the scaling unit. When the attenuator plug is placed in the position ×10, the potentiometer 57 attenuates the input signal to one hundredth, and the effective resistance of the scaling unit will be 35.4 megohms, i.e. ten times the value set up on the panel. Finally, when the attenuator plug is placed in position ×100, the input voltage is attenuated to one thousandth, and the effective resistance of the scaling unit will be 354 megohms, i.e. one hundred times the value set up on the panel. The arrangement shown in Fig. 10 therefore enables very high effective scaling resistances to be set up with a system using no individual resistor larger than 1 megohm.

The power switching panel 27 (Fig. 7) comprises switches 59, 60 for the high and low tension power supplies respectively, lamps 61, 62 for showing when the associated switches are on and a main key switch 63. It also comprises a forcing function, or F (t), selector switch 64, an internal forcing function voltage selector switch 65 and a potentiometer switch 66 for adjusting the value of the internal forcing function voltage over the range selected by 65. The circuits controlled by the switches 64, 65 and 66 are shown in Fig. 12.

As there shown, the switch 64 has two arms 64a, 64b. The switch arm 64a is connected by a line 67 to the Y amplifier, to enable the wave form of the forcing function to be examined as later described. The wiper 64b is connected by a line 68 to sockets in the set-up panel labelled F(t), also as later described. In the left hand position of the switch arms, shown in Fig. 12, the apparatus is set to generate an internal forcing function. This is a step function of varying voltage controlled by resistor 75 and potentiometer 69. On arrival of a relay pulse, produced from the timing unit as later described, at terminal 70 a valve 71 is cut off, thereby de-energising a relay coil 72 and causing a switch 73 to drop to the lower of its two contacts 74. The voltage selector switch 65 has four arms 65a–65d. According to the position of the switch 65, either a positive 50 volt supply or a negative 50 volt supply is connected to earth across the resistor 75, having a sliding contact 76 connected to lower contact 74. The position of the sliding contact 76 is adjusted by the switch 66. The potentiometer 69 acts, according to the position of the switch 65, to attenuate the voltage picked off by the slider 76 from the resistor 75, and applied, when the relay contact 73 closes on reception of a relay pulse, to lines 67, 68. When the arms of the switch 65 are in either of their extreme positions, ±50 volts is applied across the resistor 75, according to whether the arms are in their extreme left hand or extreme right hand position, and the voltage of the forcing function is a fraction of 50 volts determined by the setting of the contact 76. When the arms of the switch 65 are moved one step away from the extreme positive or negative position, the voltage of the forcing function is attenuated by the potentiometer 69, which acts in the same way as the potentiometer 57 (Fig. 10) of the scaling unit, to a fraction of 5 volts, positive or negative. When the arms of the switch 65 are moved two steps away from the extreme positive or negative position, the potentiometer 69 attenuates the voltage of the forcing function to a fraction of 0.5 volts, positive or negative.

In the central, or zero, position of the arms 64a, 64b no forcing function is generated. When these arms are in their right hand position, the lines 67, 68 are connected to a terminal 77 by means of which an externally generated forcing function, e.g. of sine wave form, may be applied to the computer.

The timing unit control panel 28 (Fig. 7) carries a number of rotary switches, the effect of which will shortly be explained with reference to Fig. 13. The following indicates the function of these switches:

78 determines the sweep duration on the oscilloscope screen,
79 serves to determine which one of several coupled computers shall serve as master,
80 serves for connection of an external oscillator to control the timing unit,
81 is an X plate selector switch,
82 controls sweep expansion,
83 provides X shift on the oscilloscope screen,
84 is a control switch for use with an external oscillator,
85 is a relay control switch, and
86 is a time marker reset push button switch.

The timing unit (Figs. 13–15) comprises an RC oscillator $V_8$, $V_9$, which generates the wave form shown at Fig. 15(a). $V_{10}$ is a Dekatron, i.e. a cold cathode counter tube, having an anode, ten cathodes and two guides, disposed between the anode and the cathodes and having input terminals 87, 88 to which the sinusoidal output of the oscillator is applied. The frequency of the oscillator is adjustable to four different values, i.e. 300, 100, 30 and 10 c.p.s., corresponding respectively to a sweep duration on the oscilloscope of 1/30, 1/10, 1/3 and 1 second, by the switch 78 which has seven arms 78(a)–78(g). As is known in the art, the discharge in the Dekatron switches progressively and cyclically from one cathode to the next at the frequency of oscillation. In Fig. 13, the output terminal of the 0 cathode of the Dekatron is indicated at 89, that of the 5 cathode at 90 and that common to the remaining eight cathodes at 91. The output of all the cathodes of the Dekatron is applied, through a differentiating network 92, 93 and 94, 95 to a terminal 192 connected to the Y amplifier and serving to provide a time marker display. 92 and 94 represent respectively those capacitors of two groups, of four capacitors each, selected according to the position of the switch arms 78e and 78f, while 93 and 95 are resistors. The wave form of the output from the Dekatron is shown at Fig. 15(b) and it will be noted that the pulses from the 0 cathode are largest and that those from the fifth cathode are smaller but nevertheless accentuated in relation to those from the other cathodes which are all of equal size. The differential output, applied as the time marker display to the oscilloscope via terminal 192 and the Y amplifier, is shown at Fig. 15(c).

The output from the 0 cathode of the Dekatron, of the wave form shown at Fig. 15(d), is applied via the line 96 to a Schmidt trigger circuit, constituted by the valve $V_{11}$ and the associated capacitor 97 and resistor 98. The shaped pulses, shown at Fig. 15(e), produced by the valve $V_{11}$ are differentiated by 97, 98 to produce the wave form shown at Fig. 15(f) which is applied to an Eccles-Jordan trigger circuit constituted by a valve $V_{12}$ and associated cathode follower $V_{13}$. The cathode follower $V_{13}$ has two outputs. That from the left hand cathode of $V_{13}$, of the wave form shown at Fig. 15(g), is supplied to the terminal 99 to blank the beam of the oscilloscope during the negative excursions of the wave form and, via the line 100, to a Miller Time Base $V_{14}$ which generates the wave form shown at Fig. 15(h). The output from the right hand cathode of $V_{13}$, of the wave form shown at Fig. 15(i), is applied, when the wiper 85a of switch 85 (Fig. 7) is moved to the right to "Auto" from the "Man" position shown in Fig. 13, to a terminal 101 at which are developed the relay pulses for generating the internal forcing function and for drift correction and clamping in the amplifiers of the function units.

The terminal 101 (Fig. 13) is connected to terminal 70 in Fig. 12 and during the negative excursions of the wave form Fig. 15(i), i.e. during the display period on the oscilloscope screen Fig. 15(h), the relay pulses applied to terminal 70 generate the internal forcing function as already described. The terminal 101 (Fig. 13) is also connected to the terminal 47 in Fig. 9, and the relay pulses applied to terminal 47 effect drift correction and clamping as will now be described.

Associated with the amplifier D of each function unit are three switches 102, 103, 104 (see Fig. 1). When the drift correction switch 104 (see also Fig. 8A) is moved to apply drift correction it occupies the open position shown in Fig. 1. During the negative periods of the wave form, Fig. 15(i), applied to terminal 47 (Fig. 9) the valve $V_7$ is cut off and the relay coils 45, 46, which are associated respectively with switches 102, 103, are de-energised. Consequently the switches 102, 103 occupy the open positions shown in full lines in Fig. 1, allowing the amplifier to function during the display period. During the other half cycles of the wave form applied to the terminal 47 (Fig. 9) the relay coils 45, 46 are energised, thereby moving the switches 102, 103 to the chain-dotted, closed position shown in Fig. 1. The amplifier D is then short circuited by the switch 102 and the left hand plate of a capacitor 105 in the input circuit of the amplifier is earthed by the switch 103, thereby charging the capacitor 105 to a voltage equal to the equivalent input error voltage of the amplifier. On return of the switches 102, 103 to their full line positions at the next half cycle, the capacitor 105 applies to the input of the amplifier in series opposition a voltage equal to the error voltage, so correcting for drift.

Fig. 16(a) shows at S a solution representing a stable system in which the quantity q (Fig. 3) has died away to zero at the conclusion of the display period. The differential equations to be solved, however, sometimes represent unstable or divergent systems in which the quantity equivalent to q increases with time. Without clamping, the oscilloscope would exhibit during the second and subsequent display periods a combination of two or more oscillations, one derived from the transient injected at the start of the display period and the other derived from the transient injected at the start of the preceding display period or periods.

Clamping is achieved by discharging the feedback capacitors $Z_2$ (Fig. 1) of the integrators between successive sweeps of the time base and we accordingly arrange for the pulses produced by the timing circuit to actuate a suitable switching system, during each quiescent period, so as to discharge said feedback capacitors $Z_2$ but in addition to effecting drift correction in the amplifiers. In the case of an integrator, the impedance $Z_2$ is a capacitor which is discharged when the switches 102, 103 move to their chain line positions. In point of fact that feedback capacitor $Z_2$ will not then be completely discharged, but will remain charged to a voltage equal to the error voltage. This, however, is of the order of 0.1 volt or less and is insignificant having regard to the fact that the output voltage of the integrator during computing varies over a range of approximately ±50 volts. On initiation of each display period the switching system returns to its initial condition, in which the feedback capacitors are again able to charge and the drift correction capacitors are in series with the inputs of their respective amplifiers.

When the drift correction switch 104 is moved to its off position, the capacitor 105 is shunted by a resistor 117. Drift correction is no longer applied but output voltage is clamped to zero during drift correction periods.

Reverting to Fig. 13, the output of the Miller Time Base $V_{14}$ is applied, via a push-pull amplifier $V_{15}$ and switch arms 81a, 81b (when in the full line positions shown) to terminals 106 connected to the X plates of the oscilloscope. This is of the single gun split beam type. The X plates are operative on both sections of the beam but the two sections pass on opposite sides of a separator plate disposed between the two Y plates. One Y plate, $Y_2$, is normally supplied as later described by the Y amplifier with the output of the computing network to produce a trace S, Fig. 16(a), representing the solution of the equation. The other Y plate, $Y_1$, is supplied by the Y amplifier with the output from terminal 192 to produce the time marker display shown at T in Fig. 16(a). The oscilloscope being well known, it is not illustrated in detail, but the screen is shown at 115 in Fig. 7, together with certain control switches 116.

It is sometimes desired to control the timing unit from an external oscillator. This can be done by moving switch 80 (Fig. 7) to "Ext." This causes movement of switch arms 80a, 80b, Fig. 13, to their alternative positions. When an external oscillator is being used, its input is applied at the terminal 111 and the "External Sync" control, constituted by a resistor 107, adjustable by the switch knob 84 (Fig. 7), is effective.

The switch 79 has three arms 79a, 79b and 79c. Its purpose is to ensure that when two or more computers are interconnected one timing unit can be selected as the master. This is essential since all relay switching operations, time marker displays and time base synchronisation must be coincident in time in all computers, the solution obtained being a function of time. In the position of the switch 79 shown in Fig. 13, the timing unit shown is the master. Terminals 108, 109, 110, then serve to transmit respectively to the slave computer the output of the oscillator, the time base pulses and the relay pulses. When the switch 79 is moved to its alternative position, the timing unit shown is the slave. Terminals 112, 113, 114 serve respectively to connect the slave timing unit to the oscillator of the master timing unit and to receive time base and relay pulses from the master oscillator.

When the switch arm 85a occupies the "Man" position shown, earth potential is applied to the terminal 110. This energises the relay coils 45, 46 (Fig. 9) to apply clamping to the amplifiers of all function units. The relay coil 72 (Fig. 12) is also energised so that the switch 73 is open and no forcing function is generated. The time base alone is effective to produce two superposed linear traces on the oscilloscope screen. When the switch arm 85a is moved to "Auto," the computer functions continuously to produce repeated displays, each accompanied by injection of a forcing function, followed by extinction of the oscilloscope beams, drift correction and clamping as already described and as shown in Fig. 15(h). When the switch arm 85a is moved to "Off," the terminal 110 is connected to a source of negative potential. The clamping and drift correction switches 102, 103 are accordingly moved to their full line positions (Fig. 1) and the switch 73 (Fig. 12) is closed so injecting a single forcing function only. This single shot mode of operation is sometimes desirable for visual observation or when using the pen recorder.

Figure 7:
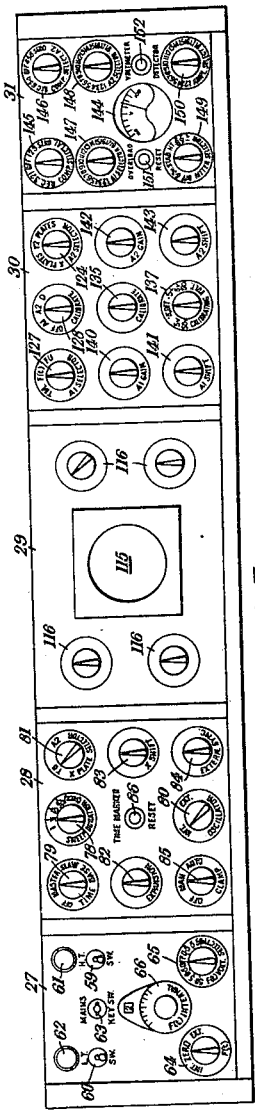
Fig. 7 is an enlarged view of the various control panels.

Sweep expansion, or expansion of the trace on the oscilloscope screen to enlarge any portion of the trace, as shown in Fig. 16(b), may be obtained by adjustment of the knob 82 (Fig. 7). This varies the potentiometer 118 (Fig. 13) and therefore the gain of the amplifier $V_{15}$. X shift (i.e. change in the position of the trace in relation to the screen, is obtained by adjustment, by means of the switch 83 (Fig. 7) of the resistor 119 (Fig. 13). The points 120, 121 are arranged to have the same D.C. potential, at a time one-half sweep duration after initiation of sweep. Adjustment of the resistor 118 therefore merely varies the sweep amplitude (symmetrically about the centre point) applied to the amplifier $V_{15}$ and produces no X shift.

It is sometimes desired to view the trace S representing the solution of the equation in a shorter or longer time than that determined by the frequency of the oscillator. This may be achieved by decreasing or increasing respectively the integrator time constants. Fig. 16(c) shows how increasing the integrator time constants enlarges part of the trace S without affecting the time marker T.

The switch arms 81a, 81b, when shifted to their alternative positions connect the anodes of amplifier $V_{15}$ to the $A_2$ amplifier (described later) of the Y amplifier. Lissajous figures can thus be obtained on the cathode ray tube when the time base is not required. During the fly-back period (drift correction period) of the time base a rectangular (beam blanking) pulse is applied to the grid of the cathode ray tube via terminal 99 as already described.

When one computer is acting as a slave to the master computer the time marker display of the slave may be out of synchronisation with that of the master. By operation of "Time marker reset" switch 86, synchronisation of the slave computor can be achieved. When this switch is closed, to make with contact 122, a pulse corresponding to that obtained from the 0 cathode of the master Dekatron tube is fed back to the 0 cathode of the slave Dekatron tube, thus transferring the glow discharge in this tube to the 0 cathode and achieving synchronisation.

The terminals 108, 109, 110, 112, 113, 114 are all connected to the sockets 32 (Fig. 6) by which connections are made to the companion computer.

The Y amplifier comprises two amplifiers $A_1$, $A_2$ (Fig. 17). The output of amplifier $A_1$ is connected, via terminal 123, to the $Y_1$ plate of the oscilloscope. The output of amplifier $A_2$ may be alternatively connected, according to the position of a switch 124 (see also Fig. 7) to terminals 125 connected to the X plates of the oscilloscope or to a terminal 126 connected to the $Y_2$ plate of the oscilloscope.

An $A_1$ selector switch 127 monitors the time marker display, the forcing function and the function unit outputs. With the arms 128a–c of a calibration switch 128 (Fig. 17) in the position shown, the switch 127 may connect to the input of the $A_1$ amplifier any one of lines 129, 130, 131. Line 129 is connected to the terminal 192 (Fig. 13) and serves to supply the time marker display to the $Y_1$ plate of the oscilloscope via the amplifier $A_1$. When the switch 127 is moved one step from the position shown in Fig 17 it connects to the amplifier $A_1$ the line 130, which is connected to the line 68 (Fig. 12). The forcing function is then applied to the $Y_1$ plate and its wave form may be examined on the oscilloscope screen. When the switch 127 is moved two steps from the position shown, it connects to the amplifier the line 131 which serves, as later described, to apply the output of a function unit to the $Y_1$ plate. Line 132 serves to apply to the input of amplifier $A_2$ the output of a function unit also as later described. Fig. 17 shows the Y amplifier set up to display the time marker via the $Y_2$ plate and the solution via the $Y_1$ plate. By shifting the switches 124, 128 it is possible to connect the output of one function unit to the X plates and that of another function unit to the Y plates, so obtaining a Lissajous figure.

A line 133 leads to the amplifier of the pen recorder, and so permits of application, from line 131, of any desired function unit output to the pen recorder when its amplifier is switched on.

When the calibration switch 128 is moved to bring its arms to positions $Q_1$, $Q_2$ respectively a D.C. voltage from a potentiometer 134 is applied respectively to the inputs of the amplifiers $A_1$, $A_2$ so permitting of accurate measurement of the gain of these amplifiers. The potentiometer 134 is adjustable by a control knob 135 (Fig. 7). By means of a potentiometer 136 which is adjustable, in precisely similar fashion to the potentiometer 69 (Fig. 12), by a switch 137 (Fig. 7) having switch arms 137a–d, the output voltage from the wiper of potentiometer 134 may be attenuated so that a D.C. voltage range of $\pm 50$ volts, $\pm 5$ volts or $\pm .5$ volts, may be applied to the input of $A_1$ and $A_2$.

Switches 140, 141 (Fig. 7) control the gain and shift of the $A_1$ amplifier and switches 142, 143 perform similar functions for the $A_2$ amplifier.

The meter unit comprises a micro-ammeter 144 (Figs. 7 and 18), two computer selector switches 145, 146, two function unit selector switches 147, 148, a meter selector switch 149, a function selector meter switch 150, an overload reset switch 151 and a voltmeter detector switch 152. Terminals 139, 153 in the meter circuit are connected respectively to lines 132, 131 in the Y amplifier (Fig. 17).

The function unit selector switches 147, 148 are capable of selecting, according to their position, any one of lines $L_1$–$L_{18}$. These lines are connected respectively to the Fnc or output terminals of the correspondingly numbered function units. Thus line $L_{10}$ is connected to all the sockets marked $F_{10c}$ on the set-up panel. The disposal of the outputs of the function units selected by the selector switches 147, 148, is controlled by the switches 145, 146 respectively. The switches 145, 146 are capable of sending to interconnected computers, along channels "Send 1–Send 6" the outputs of the function units selected by the switches 147, 148 respectively. If, say, the switch 145 is connected to channel "Send 1" and the corresponding switch in the connected computer is connected to channel "Receiver 1," the function unit outputs in the sender computer can be monitored in the receiving computer. This feature is desirable since it may be necessary to compare the phase relationship between parameters in the two computers.

When the switch 145 is set to "Off" as shown, the output of the function unit selected by the switch 147 is applied, via terminal 153, to the input of the $A_1$ amplifier of the Y amplifier (Fig. 17) and is accordingly displayed on the oscilloscope screen. Similarly, when the switch 146 is set to "Off" the output of the function unit selected by the switch 148 is applied, via terminal 139, to the input of the $A_2$ amplifier of the Y amplifier and is accordingly displayed on the oscilloscope screen.

The meter selector switch 149 is used to monitor all supply voltages in the computer, which are applied to the terminals 154 by means of the micro-ammeter 144. When the switch 149 is on any of its last three contacts, 155, the meter 144 is connected as a voltmeter and serves to measure the D.C. component of the output of any of the function units selected by the switch 150.

The terminal 156 is connected to the line 138 (Fig. 17) in the Y amplifier circuit. If the Y amplifier switch 128 is set to "Det" the voltage developed by the potentiometer 134 (Fig. 17) is applied to terminal 156 (Fig. 18). If now the switch 152, which is normally biased to make with contact 157 is displaced to make contact with contact 158, the meter 144 can be used as a null detector, the D.C. voltage of the function unit output being read on the dial 135 (Fig. 7) of the potentiometer 134.

The oscilloscope has a graticule (not shown). It is sometimes desired to know the D.C. voltage represented by a given displacement of the trace S, Fig. 16(a), on the graticule. This can be ascertained by moving the switch 128 (Fig. 17) to "Det," and adjusting the switch 124 to connect the output of the $A_2$ amplifier to the $Y_2$ plate. This applies the output of potentiometer 134 to the $Y_2$ plate via amplifier $A_2$ and by adjusting the potentiometer to give the same displacement as the trace S, the D.C. voltage in question can be read off on dial 135.

The overload reset switch 151 is a push button switch which normally occupies the position shown in Fig. 18, in which it connects a 200 volt supply to a line 159 connected to the terminals 44 of all the function unit amplifiers. When the switch 151 is actuated it disconnects the anode supply voltage from the thyratrons $V_6$ of all amplifiers, so extinguishing any of the thyratrons which may have fired during a computing period and also their associated indicator lamps 43.

The set-up panel (Fig. 19) comprises a central portion 160 and two end portions 160A, 160B. The central portion has 36 columns of sockets 161 to which the terminals Fna, Fnb, Fnc of the various function units and the terminals Sna, Snb of the various scaling units are connected. Each socket is correspondingly marked, the number of the corresponding function or scaling unit being substituted for $n$. The set-up panel includes sockets 162, labelled $F(t)$, which are wired, each through a 1 megohm resistor, to the line 68 (Fig. 12) and to which the forcing function is applied. Any socket 161, 162 can be connected to any one of the four immediately adjoining sockets by means of bridging plugs 163 (see also Fig. 20) having two pins 164, to fit into the sockets, the pins being connected by a connection 165 within the head of the plug, which is of insulating material. Precisely similar bridging plugs are used for establishing the alternative attenuating connections in the scaling units (Fig. 10) already described.

Certain sockets 166 in the set-up panel are permanently connected by transfer links 167, and any socket 166 can be connected to a socket 161 by means of one of the bridging plugs.

The columns of sockets in the set-up panel are grouped in pairs to form eighteen sections, numbered 1–18 in Fig. 19, and it will be seen that section No. 1 is allocated to Nos. 1 and 2 scaling units and to No. 1 function unit, and so on. The set-up panel includes twelve bus-bars, $B_1$–$B_{12}$, which run horizontally across the panel as seen in Fig. 19 and are wired to correspondingly numbered sockets. These are normally used as adding bus-bars and are so placed that they may be connected to the terminals $F_b$ of each section.

Figure 3:
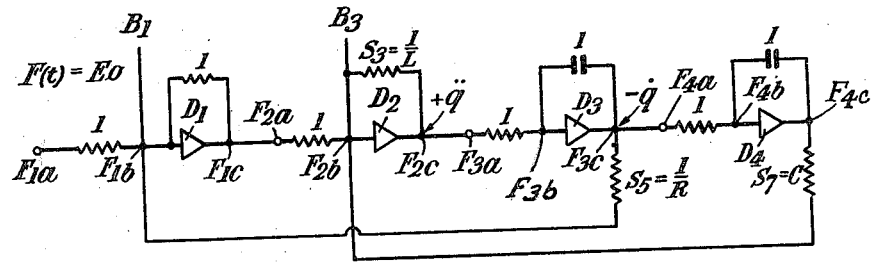

Fig. 19 shows the bridging plugs placed appropriately for the solution of the problem shown in Fig. 3. The function units $F_1$, $F_2$ are set up as adders and the function units $F_3$, $F_4$ as integrators. Considering the function unit $F_1$, it will be seen that a socket $F_{1a}$ is connected to a socket $F(t)$, a socket $F_{1b}$ to the bus-bar $B_1$, and a socket $F_{1c}$ to a socket $F_{2a}$. Similar connections may be traced for the various terminals of the other three function units and for the three scaling units $S_3$, $S_5$ and $S_7$ employed. The solution, appearing at terminal $F_{4c}$ is selected by the selector switch 147 (Fig. 18) and applied to the oscilloscope as already described.

The set-up panel embodies sockets marked T, U, V, W, X, Y, Z which provide a loop connection, all sockets marked with the same letter being wired together. This allows the initial part of a problem to be set up on the right hand side of the panel, and computing units located at the left hand side of the panel to be used for the remainder of the set up. Thus, socket $F_{18b}$ can be connected to socket $S_{2a}$ by means of the loop sockets W.

The end portions 160A, 160B of the panel include three columns of sockets each, these being used for making connections to the set-up panel of another computer; the sockets $L_{1a}$–$L_{18a}$ and $L_{1b}$–$L_{18b}$ are wired to the connecting sockets 32 (Fig. 6).

Sockets marked $Fna^1$ are connected via one megohm resistors to $Fna$ sockets, i.e. $F_{5a}^1$ is connected via a one megohm resistor to $F_{5a}$. Sockets marked $Fna^{11}$ are similarly connected via one megohm resistors to $Fna$ sockets.

With this arrangement the output of a function unit, say $F_{5c}$, can be connected to $L_{5b}$ in its computer. If the latter is interconnected with another computer, $L_{5b}$ is automatically connected with $L_{5a}$ in the other computer. Thus by connecting $L_{5a}$ to $F_{5a}^1$ in the other computer, $F_{5c}$ in the first computer is connected to the input of $F_5$ in the other computer. Sockets $L_{19a}$, $L_{20a}$, $L_{21a}$, $L_{22a}$, $L_{19b}$, $L_{20b}$, $L_{21b}$ and $L_{22b}$ are provided to give versatility in the connections of inputs and outputs of function units between computers.

In the foregoing it has been assumed that the system is in a quiescent condition before application of the transient or forcing function. This is not necessarily so and it is sometimes desirable to investigate the response of the system to a disturbance when it is already in a disturbed condition, i.e. when the various terms in the differential equation are not individually zero at $t=0$. Introduction of such initial conditions may be effected, as indicated in Fig. 21, by applying to the feedback capacitors $Z_2$ of the integrators an appropriate voltage prior to application of the transient. Thus the feedback capacitor may be initially charged to some positive voltage, e.g. 10 volts, far exceeding the negligible error voltage previously mentioned. In the case of the adder, the initial condition is introduced by connecting an appropriate source of constant D.C. potential, $V_{DC}$, to its input.

In the cases hitherto discussed, it is necessary that the output voltage of each computing component should be zero whenever a transient is applied to the system, and it is for this reason that drift correction is necessary. Where initial conditions are to be introduced, however, it is necessary that the output voltage of each computing conponent should be a predetermined voltage representing the initial condition, it being immaterial how much of that voltage is attributable to drift provided it remains constant during the display period and how much of it is attributable to the voltage injected as described below. Drift correction is therefore no longer necessary.

Fig. 21 shows an integrator with provision for introduction of an initial condition. In addition to the switches 102, 103 of Fig. 1 it embodies a manually operable three-pole change-over switch 200, 201, 202. When the switch contacts 200, 201, 202 are in their full line positions, movement of the switches 102, 103 to their chain line positons effects drift correction and clamping as previously described. When, however, the switch contacts 200, 201, 202 are moved to their chain line positions the capacitor 105 is short circuited. Movement of the switches 102, 103 to their chain line positions then causes the feedback capacitor $Z_2$ to be charged to a voltage determined by the relative values of the resistors 203, 204 and the magnitude of the D.C. potential $V_{DC}$ applied to terminal F$na$.

The amplifier D is short-circuited by the resistor 204, its output voltage $V_0$ depending on the value of 204. As the amplifier has a high gain, the voltage at the point 205 can be considered as zero. The feedback capacitor is accordingly charged to the voltage $V_0$. This may be measured on a meter and adjusted to the value required for any particular computation by adjustment of the resistor 204.

Reference has hiterto been made to the use of a two beam oscilloscope, the voltage representing the solution of the equation being applied to one beam and the time marker to the other. It is possible, however, to use a single beam oscilloscope, the pulses to form the timing marks and the solution voltage both being applied to the Y plates, in which case the timing marks will appear as vertical lines projecting from the trace. Alternatively the timing marks may be applied to the grid of the oscilloscope, in which case they will appear as brighter spots on the trace.

What we claim as our invention and desire to secure by Letters Patent is:

1. An analogue computer comprising a number of computing units, each including a plurality of direct coupled amplifiers, each of said amplifiers having an output terminal and first and second input terminals whereby different input signals may be applied simultaneously to said amplifier, said second input terminal being directly connected to the amplifier and said first input terminal being connectable to said amplifier through said second input terminal, a function unit associated with each amplifier and comprising three impedances, one of said impedances being a capacitor and the other two of said impedances being resistors, switching mechanism associated with each combined amplifier and function unit and including banks of switch contacts connected to the impedances of the function unit and switch arms respectively connected to said terminals of the amplifier, said switch arms being movable in relation to said switch contacts to alternative positions, in one of which one of the resistors is connected between said first and second input terminals and the capacitor is connected between the second input terminal and the output terminal and in another of which one of said resistors is connected between the first and second input terminals and the other resistor is connected between the second input terminal and the output terminal, and a plurality of scaling units for providing feed back between different amplifiers, each scaling unit being constituted by an adjustable resistor having two terminals and further switch mechanism for adjusting said scaling units, and a set-up panel having terminals wired to the amplifier and scaling unit terminals of all the computing units, the terminals on the panel bearing markings indicative of the connected computing unit terminals, and connectors for bridging closely adjacent terminals on the panel, and thereby establishing connections between the computing unit terminals.

2. An analogue computer according to claim 1, in which the terminals in the panel are constituted by sockets and the connectors by two-pin bridging plugs.

3. An analogue computer according to claim 1, wherein the set-up panel includes a plurality of bus-bars, each wired to a number of terminals on the panel.

4. An analogue computer according to claim 1, comprising means for periodically generating a forcing function and terminals on the set-up panel connected to the output of the forcing function generator.

5. An analogue computer according to claim 1, comprising a selector switch movable over a range of contacts wired to the output terminals of the amplifiers, an oscilloscope for providing a visual representation of the solution of a problem set up on the set-up panel, a meter for measuring the direct-current voltages of the outputs of the amplifiers, and a switch movable to connect the output of the selector switch either to the oscilloscope or to the meter.

6. An analogue computer comprising an electrical network which can be set up to represent a differential equation to be solved, an oscilloscope connectable to said network and having a screen for exhibiting the solution of the equation in the form of a trace and a timing circuit, comprising an oscillator, a frequency divider coupled to the oscillator and having a number of output terminals arranged to emit pulses in succession in response to the pulses emitted by the oscillator, means connected to one output terminal of the frequency divider for generating a time base and applying it to the oscilloscope and for also applying pulses to said network to initiate computing periods and further means connected to all of the output terminals of the frequency divider for applying pulses therefrom to the oscilloscope to form timing marks on the screen of said oscilloscope.

7. An analogue computer according to claim 6, in which the frequency divider is a 10:1 frequency divider.

8. An analogue computer according to claim 6, in which the oscilloscope produces two electron beams and has a pair of X plates and a pair of Y plates, one for controlling each electron beam, and comprising means for applying the time base to the X plates of the oscilloscope, means for applying from said network a voltage representing the solution of the equation to the Y plate controlling one electron beam and means for applying the pulses for forming the timing marks to the Y plate controlling the other electron beam.

9. An analogue computer according to claim 6, in which the pulses generated at the output terminal of the frequency divider connected to the time base are accentuated in relation to the pulses generated at its other output terminals.

10. An analogue computer according to claim 6, wherein said means for applying pulses to the network comprises a trigger circuit between the frequency divider and the time base.

11. An analogue computer according to claim 10, wherein said trigger circuit also generates pulses for blanking out the oscilloscope beam during the intervals between the application of pulses to said network.

12. An analogue computer comprising a plurality of direct-current amplifiers, means for connecting said amplifiers in circuit to form a computing network for solving differential equations wherein at least one of said amplifiers is organized as an integrator and at least one other of said amplifiers is organized as an adder, said network having an input terminal and an output terminal, an oscilloscope connectible to said output terminal and having a screen for displaying the solution of the equation, a timing circuit for feeding pulses at regular intervals to said input terminal to initiate a series of computing periods, and further pulses at the same timed intervals to the oscilloscope to initiate a series of displays thereon, and means controlled by the timing circuit for automatically applying drift correction and clamping to the amplifiers in the computing network during the intervals between computing periods.

13. An analogue computer according to claim 12, wherein each amplifier has a drift correcting capacitor in series with its input, wherein each amplifier organized as an integrator has a feed-back capacitor, and wherein said means controlled by said timing circuit comprises a switch mechanism which, during the intervals between computing periods, is positioned to charge the drift correcting capacitor of each amplifier in said network to a voltage equal to the equivalent input error voltage of said amplifier and further switch mechanism which, during the intervals between computing periods, is positioned to discharge the feed-back capacitors of all amplifiers in said network which act as integrators.

14. An analogue computer according to claim 13, comprising a source of direct-current potential and, in association with each amplifier in the network, a manually operable switch movable from a normal inoperative position to a position in which the drift correcting capacitor of said amplifier is short circuited and, on movement of said further switch mechanism during the intervals between computing periods, the feed-back capacitor of each amplifier acting as an integrator is charged to a positive voltage and said source of constant direct-current potential is connected to the input of each amplifier acting as an adder.

References Cited in the file of this patent
UNITED STATES PATENTS

| | | |
|---|---|---|
| 2,516,888 | Levy | Aug. 1, 1950 |
| 2,619,552 | Kerns | Nov. 25, 1952 |
| 2,734,949 | Berry | Feb. 14, 1956 |

OTHER REFERENCES

Ragazzini et al.: "Analysis of Problems in Dynamics by Electronic Circuits," proceedings of the I.R.E., vol. 35, No. 7, May 1947, pages 444–452.

MacNee: "An Electronic Differential Analyzer," proceedings of the I.R.E., vol. 37, No. 11, Nov. 1949, pages 1315–1324.

Electronics (Bosworth), Aug. 1951, pages 216, 218, 220 and 222.

Proceedings of the IRE (Bubb), Dec. 1951,, page 1557.

Catalog and Manual on GAP/R High Speed All-Electronic Analog Computers for Research and Design (Philbrick), 1951, pages 6, 7, 23 and 24.

Conference Internationale des Grands Reseaux Electriques a Hante Tension, paper No. 320, vol. III (Obradovic), May 1952, reprint available in "A Palimpsest on the Analog Art," pages 233–236, edited by Paynter, 1955.

Korn and Korn: Electronic Analog Computers, McGraw-Hill Book Co., Inc., 1952, pages 336, 338 and 342.

Symposium on Industrial Applications of Automatic Computing Equipment (Morrill), Jan. 1953, pages 107 and 108.